(12) United States Patent
Bertsch et al.

(10) Patent No.: US 7,831,364 B2
(45) Date of Patent: Nov. 9, 2010

(54) "OFF-BOARD" CONTROL FOR A POWER MACHINE OR VEHICLE

(75) Inventors: Brady J. Bertsch, Wahpeton, ND (US);
Scott R. Rossow, Kindred, ND (US);
Shawn R. Vasichek, Fargo, ND (US)

(73) Assignee: Clark Equipment Company, West Fargo, ND (US)

( * ) Notice: Subject to any disclaimer, the term of this patent is extended or adjusted under 35 U.S.C. 154(b) by 1125 days.

(21) Appl. No.: 11/503,515

(22) Filed: Aug. 11, 2006

(65) Prior Publication Data

US 2008/0040007 A1    Feb. 14, 2008

(51) Int. Cl.
*G06F 19/00* (2006.01)

(52) U.S. Cl. .......................... 701/50; 37/414

(58) Field of Classification Search ............. 701/50, 701/1; 172/810–812; 37/382, 414
See application file for complete search history.

(56) References Cited

U.S. PATENT DOCUMENTS

| | | | | |
|---|---|---|---|---|
| 5,551,518 A * | 9/1996 | Stratton | .................. | 172/4.5 |
| 5,551,524 A | 9/1996 | Yamamoto et al. | ......... | 180/6.62 |
| 6,030,169 A | 2/2000 | Rossow et al. | .............. | 414/680 |
| 6,189,626 B1 * | 2/2001 | Hanseder | ................... | 172/4.5 |
| 6,273,771 B1 | 8/2001 | Buckley et al. | ............... | 440/84 |
| 6,283,220 B1 | 9/2001 | Carter | ........................ | 169/24 |
| 6,405,114 B1 | 6/2002 | Priestley et al. | ............... | 701/50 |
| 6,493,616 B1 | 12/2002 | Rossow et al. | ................ | 701/29 |
| 6,527,348 B2 | 3/2003 | Jensen | ....................... | 303/9.63 |
| 6,862,443 B2 | 3/2005 | Witte | ......................... | 455/345 |
| 6,923,281 B2 | 8/2005 | Chernoff et al. | ........... | 180/65.2 |
| 6,923,285 B1 | 8/2005 | Rossow et al. | ............. | 180/272 |
| 2002/0175561 A1 | 11/2002 | Jensen | ...................... | 303/113.1 |
| 2003/0116936 A1 | 6/2003 | Felsing et al. | ......... | 250/124.166 |
| 2005/0060060 A1 | 3/2005 | Reasoner et al. | ........... | 700/214 |

FOREIGN PATENT DOCUMENTS

| | | |
|---|---|---|
| GB | 2419429 | 4/2006 |
| WO | WO 02/057324 A1 | 8/2001 |

OTHER PUBLICATIONS

Communication from European Patent Office containing the extended European Search report for related Application No. 07253045.4-1244/1887148; date Mar. 8, 2009; 10 pages.
Translation of the First Office Action for related Chinese Application No. 200710140754.7; dated prior to Jan. 18, 2010; 6 pages.

* cited by examiner

*Primary Examiner*—Yonel Beaulieu
(74) *Attorney, Agent, or Firm*—Westman, Champlin & Kelly, P.A.

(57) ABSTRACT

"Off-board" operating control for a power machine or vehicle is described. The "off-board" operating control includes a receiver unit that is configured to receive operating commands transmitted from an "off-board" control unit. The receiver sends commands from the "off-board" control unit to a control component through a controller area network "on-board" the power machine or vehicle. In illustrated embodiments, the receiver unit is coupled to the controller area network through a connector, which plugs into an "off-board" controls module of the controller area network for plug and play operations.

20 Claims, 7 Drawing Sheets

"OFF-BOARD" CONTROL FOR A POWER MACHINE OR VEHICLE

BACKGROUND OF THE INVENTION

Power machines, such as skid steer loaders or diggers are used for a wide variety of applications in different environments or sites. For example, power machines can be used at a building construction site or at a landscaping or highway construction site. Typically, the loader or power machine is operated through operating controls "on-board" the power machine, for example through operating levers and controls located in the cab of the power machine or vehicle. In some environments or applications, it may not be feasible or desirable to operate the machine from the cab. For example, at a building site or highway construction site, it may be difficult to operate the machine from the cab, because of limited visibility and sight from the cab and/or the area or space in which the machine or vehicle must operate. The present invention addresses these and other issues and provides advantage over prior operating control systems for a power machine or vehicle.

SUMMARY OF THE INVENTION

The present invention relates to "off-board" control of a power machine or vehicle for operation of the power machine or vehicle outside of or remote from the cab of the power machine or vehicle. Embodiments of the invention include a receiver on-board a power machine that is configured to receive operating commands transmitted from an "off-board" control unit. The receiver sends commands from the "off-board" control unit to various operating controllers or functions on the power machine through a controller area network "on-board" the power machine or vehicle. In illustrated embodiments, the receiver is coupled to the controller area network through a connector, which plugs into an "off-board" control module of the controller area network for plug and play operations.

DETAILED DESCRIPTION OF ILLUSTRATIVE EMBODIMENTS

Figure 1:
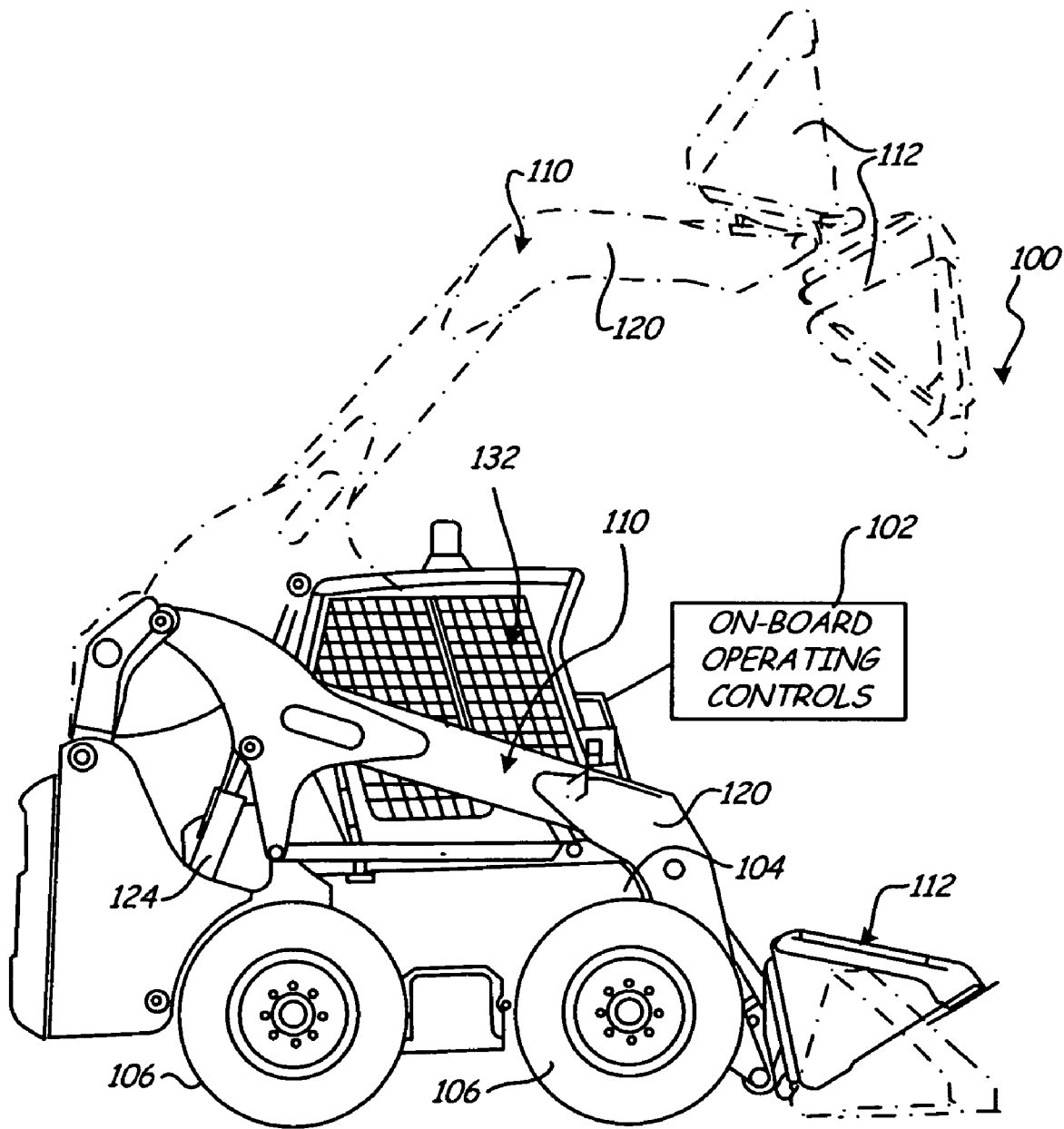
FIG. 1 is a side elevational view of a power machine having "on-board" operating controls.

FIG. 1 illustrates an embodiment of a power machine or vehicle 100 that is operated through "on-board" operating controls 102 (illustrated schematically in FIG. 1). As shown the illustrated power machine includes a body 104 that is supported relative to a frame (not shown). Wheels 106 are coupled to the frame so that the power machine 100 or vehicle can be driven over the ground during use. Application, however, of the present invention is not limited to a wheeled vehicle or loader as shown. For example, the present invention has application for a power machine, which moves along a track instead of wheels.

As shown in FIG. 1, the illustrated power machine 100 includes a boom assembly 110 that is used to raise, lower or position a work implement or attachment 112, (which in the illustrated embodiment is a bucket). The boom assembly 110 includes lift arms 120 (only one of which is shown in FIG. 1). Lift arms 120 are pivotally coupled to the body 104 of the machine to raise and lower the attachment 112. Fluid cylinders or actuators 124 (only one shown in FIG. 1) are coupled to the body 104 and lift arms 120 to raise and lower the lift arms 120 as comparatively shown in FIG. 1.

The attachment or implement 112 is rotationally coupled to the lift arms 120 so that an orientation of the implement 112 can be adjusted relative to the lift arms 120. Implement 112 is rotationally adjusted or tilted via a tilt cylinder or cylinders (not shown in FIG. 1). The tilt cylinder or cylinders is extended and retracted to adjust the orientation or tilt of the attachment or implement 112. Although FIG. 1 illustrates a bucket attachment or implement, application is not limited to a bucket and other implements can be attached to the lift arms 120 or machine depending upon the particular work application.

In the embodiment illustrated in FIG. 1, the machine is operated or controlled through the "on-board" operating controls 102 from a compartment or cab 132 of the machine. The "on-board" operating controls include various levers, pedals, keys or buttons that allow the user to move the power machine or vehicle in a forward direction, reverse direction and/or steer the machine or vehicle. The "on-board" operating controls 102 also include inputs, levers or joysticks to allow the user to operate the boom assembly or hydraulics to raise, lower and tilt the implement 112.

As previously discussed, different attachments or implements can be connected to the lift arms 120 depending upon the particular work application. For example, lift arms 120 of the power machine can support a bucket or a powered implement, such as a spade, that includes an independently powered function. The independently powered function is also operated through operating controls or levers of the "on-board" operating controls 102.

Figure 2:
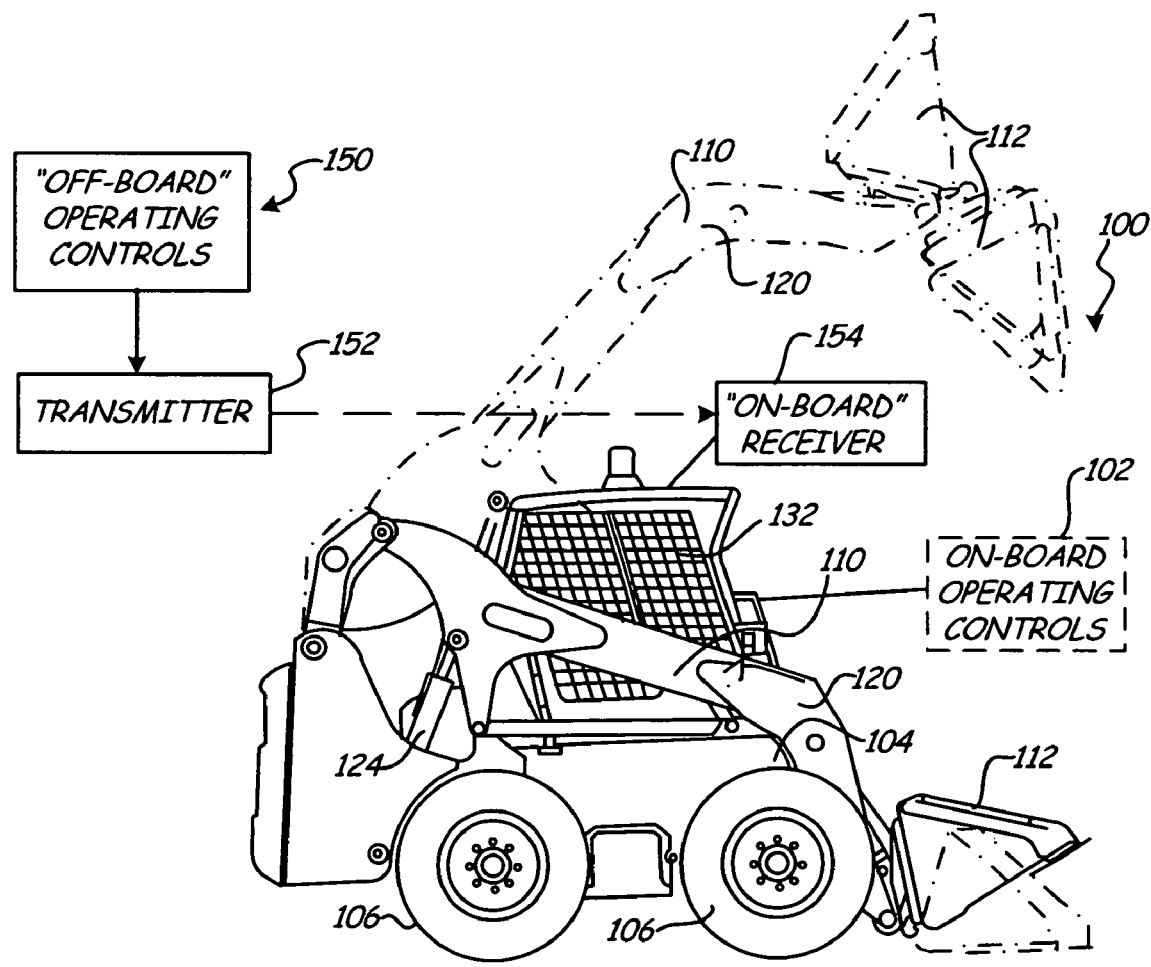
FIG. 2 is a side elevational view of a power machine having "on-board" operating controls and "off-board" operating controls implemented through an "on-board" receiver.

FIG. 2 illustrates an embodiment of a power machine or vehicle 100 including off-board operating control where like numbers are used to refer to like parts in the previous FIG. As shown, a control system of the machine includes "off-board" operating controls 150 to operate functions of the machine remote from or "off-board" the machine. As shown, operating commands from the "off board" operating controls 150 are transmitted by transmitter 152 to an on-board" receiver 154 on the power machine or vehicle. The transmitter 152 transmits control signals responsive to input from the off-board operating controls 150. The transmitted signal or command is received by the "on-board" receiver 154 and is used to control one or more functions of the machine through a controller area network (CAN) 160 as shown in FIG. 3.

Figure 3:
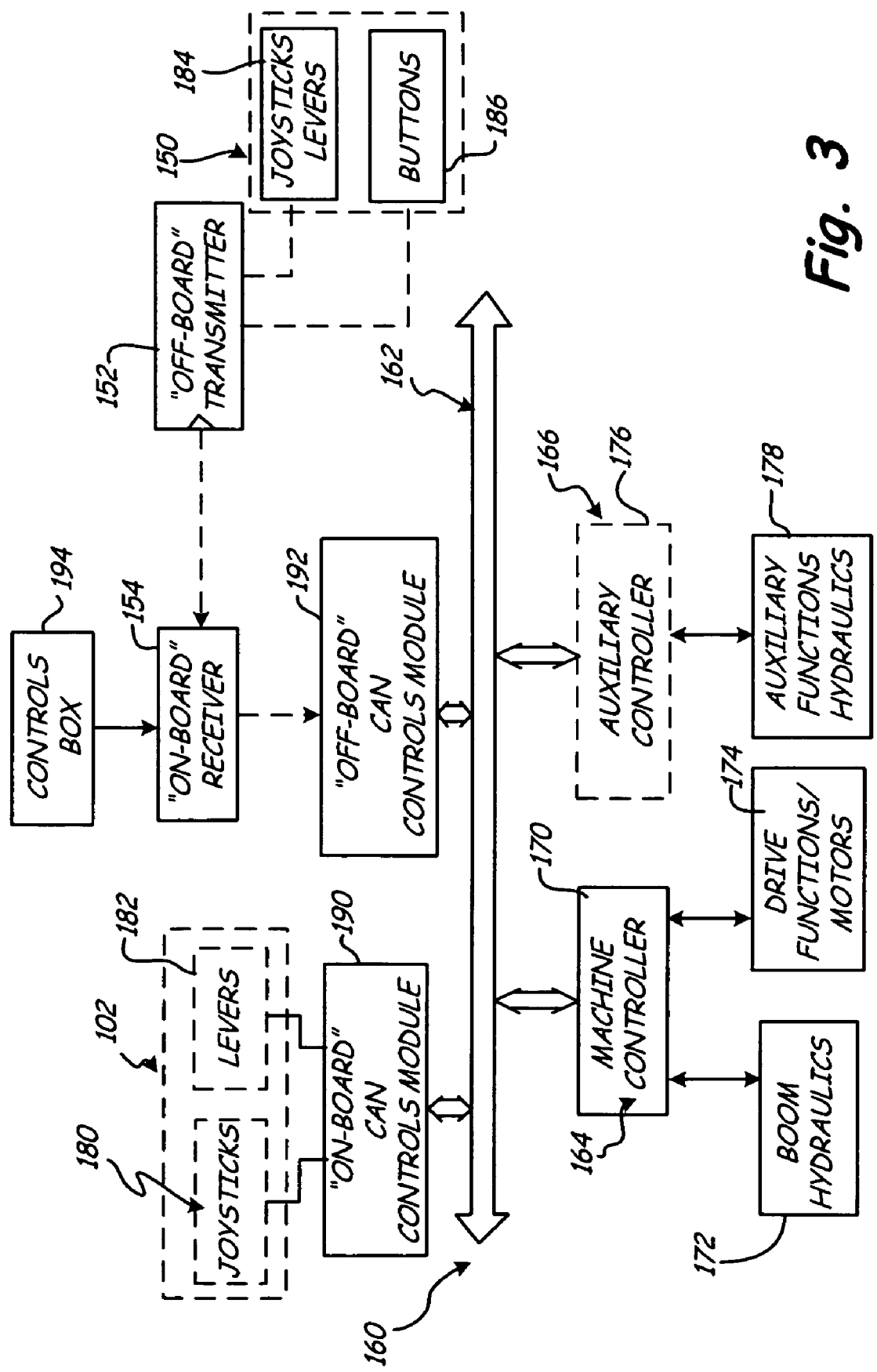
FIG. 3 is a schematic illustration of an embodiment of a control system including "on-board" and "off-board" operating controls implemented through a controller area network.

As shown in FIG. 3, control of machine functions is implemented through various control modules or components connected to a CAN bus 162. In the embodiment shown, CAN 160 includes a machine control module 164 and auxiliary control module 166. As shown, the machine control module 164 includes a machine controller 170 that is configured to operate boom hydraulics 172 for lift and tilt functions and drive functions or motors 174 (illustrated schematically) of the machine based upon input from "on-board" and/or "off-board" operating controls 102, 150. The auxiliary control module 166 includes an auxiliary controller 176 that is configured to control auxiliary functions 178 of a powered attachment or implement based upon input from operating controls 102, 150. The machine control module 164 and auxiliary control module 166 are configured to interface with the CAN bus 162 via known communication protocols.

Application of the illustrated operating controls is not limited to a machine control module and auxiliary control module and other control configurations can be employed. For example, controllers or modules for the boom assembly and drive assemblies can be separately connected to the CAN bus 162 to control the boom assembly or hydraulics, the drive assembly or other machine functions.

As previously described, a user can control machine functions through "on-board" operating controls 102, which as shown in FIG. 3 include illustratively, joysticks 180 and levers 182 and "off-board" operating controls 150 (illustratively joystick/levers 184 and buttons 186). As shown, the "on-board" operating controls 102 are coupled to the CAN bus 162 or network through an "on-board" CAN controls module 190. Additionally, the "on-board" receiver 154 is linked to the CAN bus 162 through an "off-board" CAN controls module 192. As described, the operating commands from "on-board" and "off-board" operating controls 102, 150 are transmitted to the CAN bus 162 through the "on-board" and "off-board" controls modules 190, 192 to interface with the machine controller 170 or auxiliary controller 176 to operate hydraulics, valves or pumps of the drive motors, lift and tilt cylinders or auxiliary hydraulics or functions of the power machine or vehicle.

In the illustrated embodiment in FIG. 3, the "off-board" transmitter 152 transmits signals or commands responsive to activation of the "off-board" operating controls 150 to the "on-board" receiver 154. Signals or commands received from the "off-board" transmitter 152 are used to control functions of the power machine through the CAN 160. In the illustrated embodiment "on-board" receiver 154 also receives input from a controls box 194 "on board" the machine or vehicle as will be described.

Figure 4:
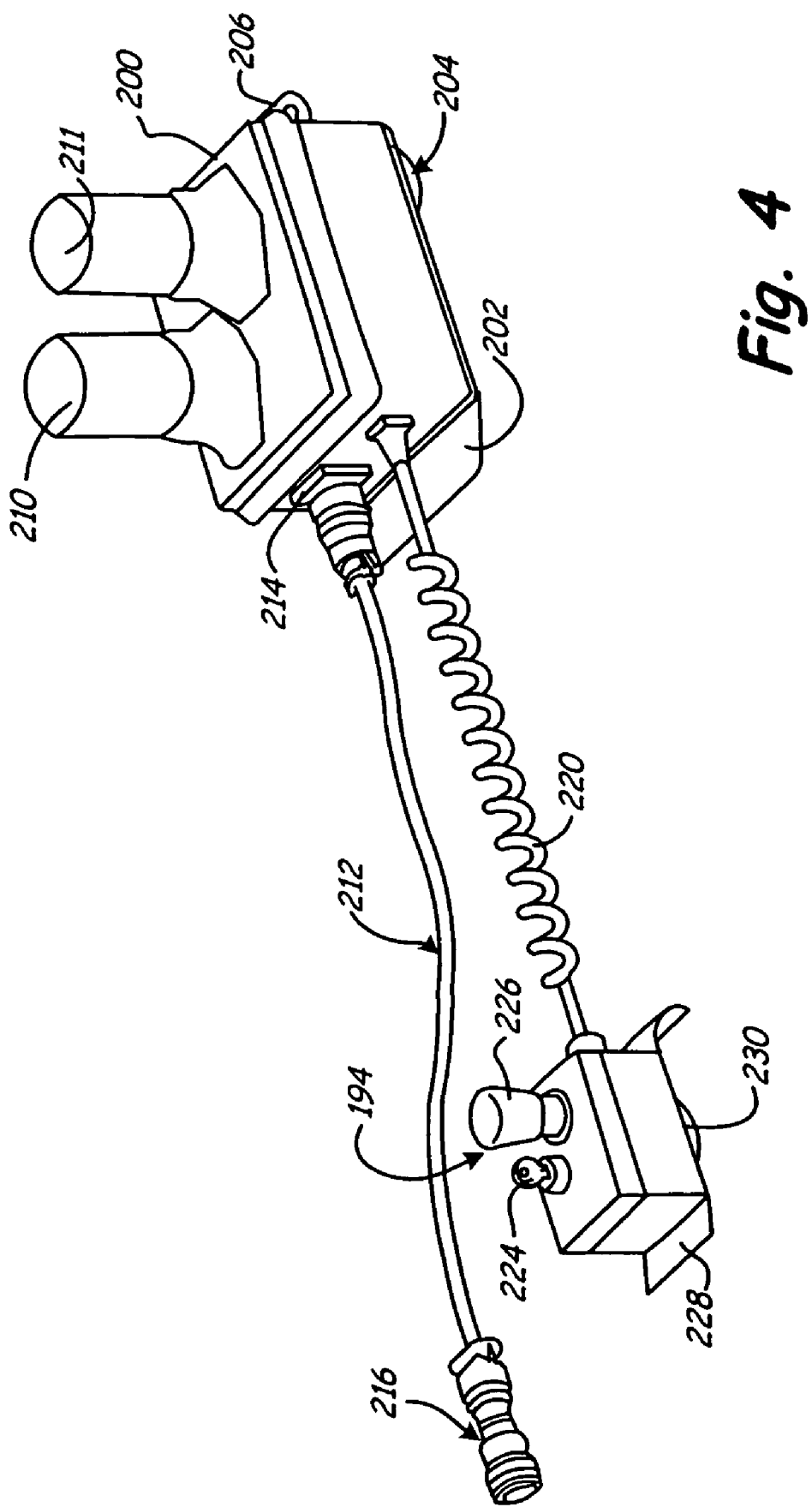
FIG. 4 illustrates an embodiment of a receiver unit pluggable into a control module of a controller area network of a power machine or vehicle through a connector or cable.

FIG. 4 illustrates an embodiment of a "on-board" receiver unit 200 for implementing "off-board" operating control as illustrated in FIG. 3. The receiver unit 200 including a receiver 154 that is configured to receive operating commands from the "off-board" transmitter 152. In the illustrated embodiment, the "on-board" receiver unit 200 is removably coupled to the machine or vehicle 100 for use through a mounting bracket 202 on the receiver unit 200.

The mounting bracket 202 includes a magnet 204 which is designed to hold the receiver unit 200 to a metal or magnetic surface of the power machine or vehicle 100. In the embodiment shown, the receiver unit 200 also includes a handle 206 on the housing for ease of portability and handling. The handle 206 provides an accessory to transport the receiver unit 200 and mount the receiver unit 200 to a desired power machine or vehicle 100. The receiver unit 200 also includes indicator lights 210, 211 that extend from a top surface of the receiver housing to indicate when the receiver is enabled and/or the power machine or vehicle is operating. In an illustrative embodiment, light 210 indicates when the receiver is enabled and light 211 indicates when the transmitter is enabled or activated for remote control as described.

The receiver unit 200 is connected to the "off-board" CAN controls module 192 through cable 212. In the embodiment shown, cable 212 removably plugs into a socket 214 on the receiver unit 200 and connects to the "off-board" CAN controls module 192 through connector plug 216. Although a particular attachment is shown for cable 212, application is not limited to the specific attachment shown. For example, cable 212 can be fixed to receiver unit 200.

Also as shown in FIG. 4, a control box 194 is connected to the receiver unit 200 through cable 220 which connects to or plugs into a socket on the receiver unit 200. Although a particular cable attachment is shown for cable 220, application is not limited to the specific embodiments shown, for example cable 220 can be fixedly attached or removably attached to one or both of the receiver unit 220 or controls box 194.

In the illustrated embodiment shown, the controls box 194 includes a turn-key switch 224 to active the receiver of the receiver unit 200 and alternatively shut off the receiver of the receiver unit 200. In the off position, the receiver unit is not activated to receive "off-board" operating commands. To activate "off-board" controls, the turn-key switch 224 is rotated to an on-position so that the receiver processes operating commands transmitted "off-board" of the machine or vehicle. Once activated, the vehicle operation can be halted via a stop button 226 on the controls box 194. Activation of the stop button 226 is transmitted to the machine controller 174 and auxiliary controller 176 through the CAN 160 to halt operation of the vehicle functions.

As shown, the controls box 194 includes a mounting bracket 228 and magnet 230 to removably mount the controls box 194 to a metal or magnetic surface of the machine or vehicle 100. As shown, in the illustrated embodiment the bracket 228 includes a curved mounting surface to mount or interface with a curved surface of the power machine or vehicle.

Figure 5:
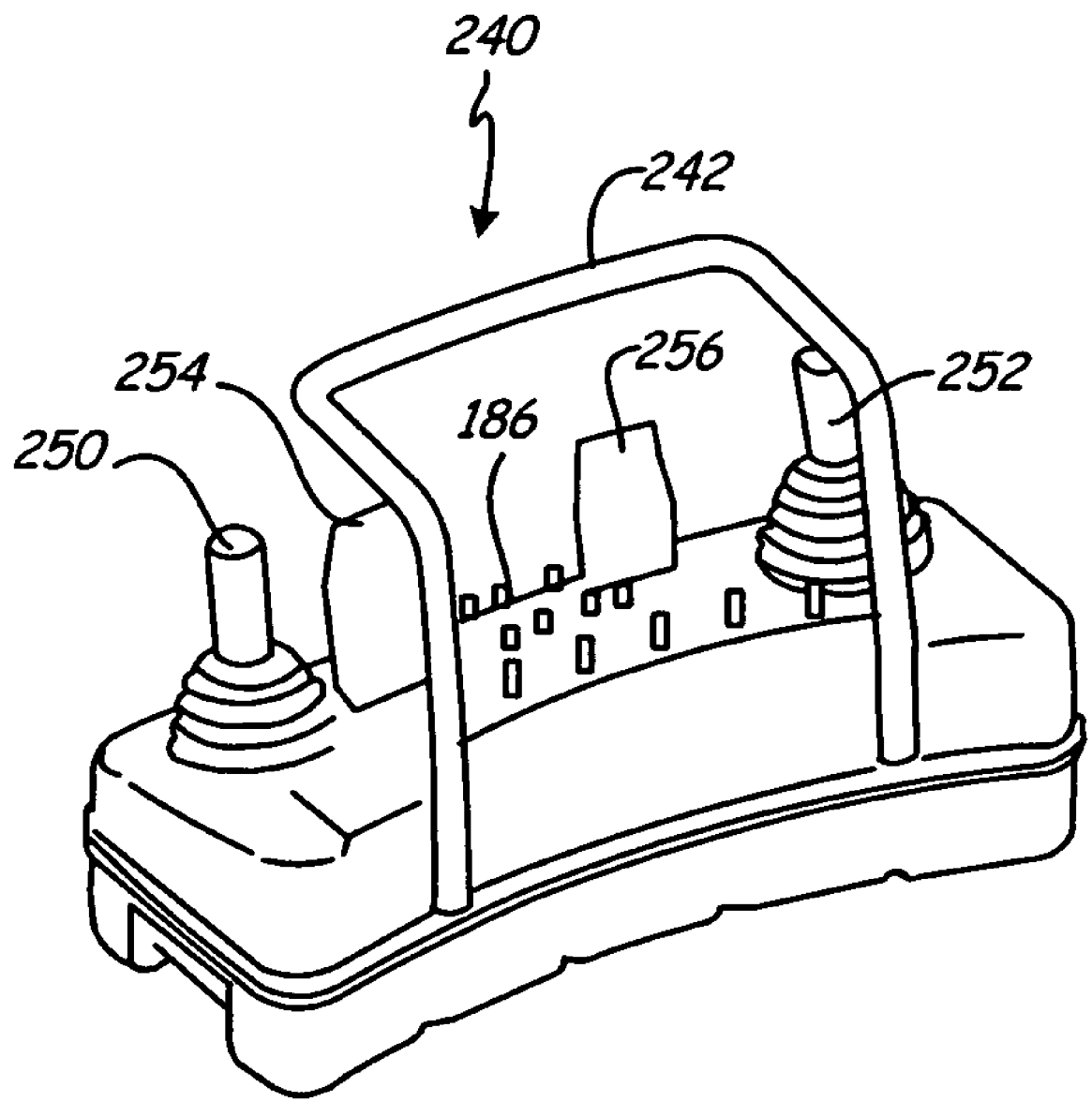
FIG. 5 illustrates an embodiment of an "off-board" control unit configured to implement operating commands through an "on-board" receiver and controller area network.

FIG. 5 illustrates an embodiment of an "off-board" control unit 240 for activating operating commands remotely from the power machine or vehicle. As shown, the "off-board" control unit 240 includes a control panel having a plurality of operating controls (i.e. joysticks, buttons, and levers, etc.). Operating commands activated through the control panel (e.g. joy sticks and levers, etc.) are transmitted to the "on-board" receiver unit 200 through a transmitter of the "off-board" control unit 240. The device is powered by a battery (not shown) supported in a housing cavity. The illustrated "off-board" control unit 240 also includes a handle 242 for portability.

Figure 6:
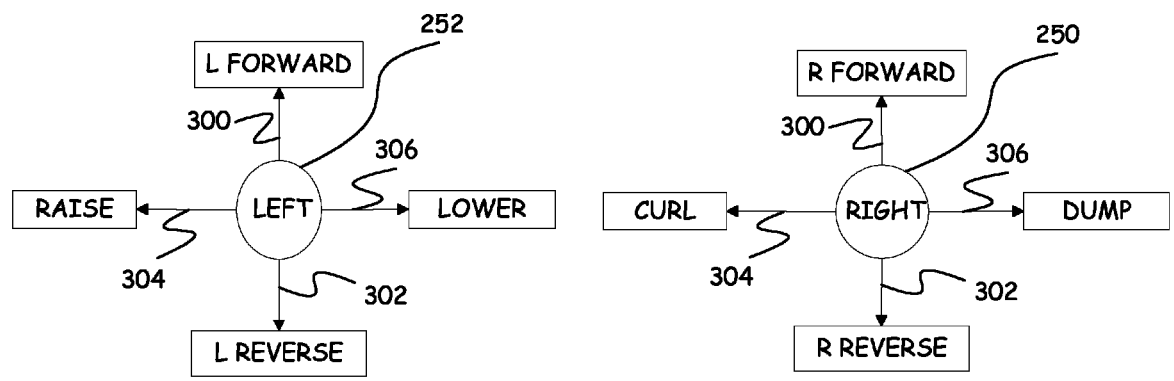
FIG. 6 is a schematic illustration of an H pattern.

In the illustrated embodiment, the operating controls of the "off-board" control unit 240 include "right" and "left" joy sticks 250, 252, which are configured to drive and steer the power machine or vehicle 100. The joy sticks 250, 252 can be configured in an H pattern or an ISO pattern to provide forward, reverse and steer control to the vehicle or power machines as is know in the art. FIG. 6 schematically illustrates an H pattern as known in the art. In the illustrated embodiment, forward and reverse movement of joystick 250, 252 in directions 300 and 302 cooperatively control drive and steer functions of the power machine as is known in the art. Lateral movement of joy sticks 250, 252 in directions 304 and 306 control hydraulic functions, e.g. lift and tilt cylinders of the power machine.

Figure 7:
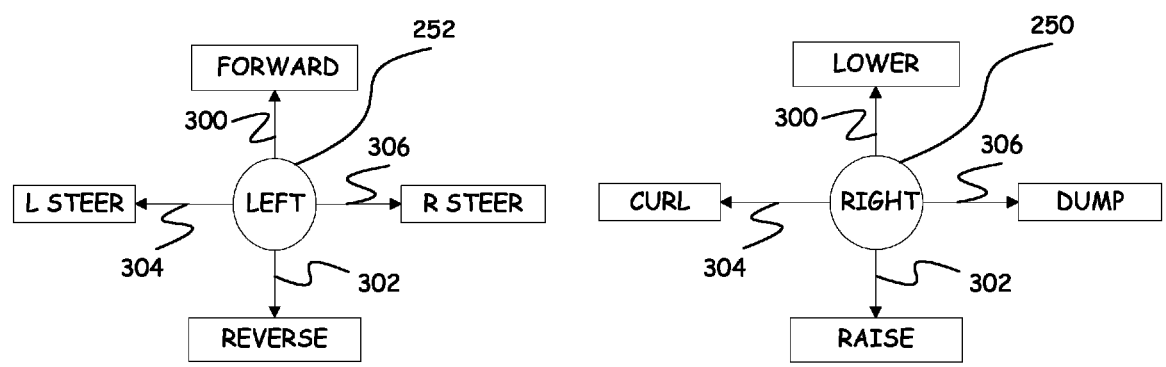
FIG. 7 is a schematic illustration of an ISO pattern.

In contrast FIG. 7 illustrates an ISO pattern as is known in the art. In the ISO pattern, one joystick 252 controls drive functions while the other joystick 250 controls hydraulic functions e.g. lift and tilt cylinders. In the embodiment shown, forward and reverse movement in directions 300 and 302 of the joystick 252 controls forward and reverse drive and lateral movement in directions 304 and 306 controls steer.

Forward and reverse movement 300, 302 of joystick 250 controls lift and lateral movement 304, 306 controls tilt functions.

The control panel also includes universal auxiliary control levers for example, "right" and "left" auxiliary levers 254, 256 to control different auxiliary functions for different implements or attachments. The control panel also includes additional buttons, knobs or levers, which can be used to activate different functions of the machine through the CAN 160. For example, in an illustrative embodiment, the control panel includes a turn-key switch, an emergency stop button and a switch or button that enables or activates the transmitter for remote drive and steer control through the CAN 160.

Although the present invention has been described with reference to preferred embodiments, workers skilled in the art will recognize that changes may be made in form and detail without departing from the spirit and scope of the invention.

What is claimed is:

1. A kit assembly for a power machine or vehicle comprising:
    an "on-board" control unit having a body mountable to the power machine or vehicle and including a wireless receiver configured to receive input operating commands;
    a cable connected or connectable to the "on-board control unit and including a connector pluggable into a controller area network of the power machine or vehicle; and
    an "off-board" control unit including a body structure having an upper surface including a plurality of actuatable input devices extending from the upper surface to form a control panel wherein a first actuatable input device is actuated to input a first operating command to control a first hydraulic or drive component and a second actuatable input device spaced from the first actuatable input device and the second actuatable input device is actuated to input a second operating command to control a second separate hydraulic or drive component and the "off-board" control unit includes a wireless transmitter configured to transmit the input operating commands to the receiver of the "on-board" control unit to operate the hydraulic or drive components through the controller area network.

2. The kit assembly of claim 1 wherein the kit assembly comprises:
    a mounting assembly configured to removably mount the "on-board" control unit to the power machine or vehicle.

3. The kit assembly of claim 1 in combination with a controls box coupled to the "on-board" control unit to connect the controls box to the controller area network bus through the "on-board" control unit.

4. The kit assembly of claim 3 wherein the controls box includes one of a turn key switch and an emergency stop.

5. The kit assembly of claim 4 wherein the controls box includes a mounting assembly or magnet to removably mount the controls box to the power machine or vehicle and the kit assembly comprises a cable to operably connect the controls box to the "on-board " control unit.

6. A method comprising the steps of:
    providing a control unit having a wireless receiver "on-board" a power machine or vehicle connected to a controller area network of the power machine or vehicle;
    actuating a switch to enable "off-board" control of the power machine or vehicle;
    driving the power machine or vehicle in a forward or reverse direction by actuating one or more input devices on an "off-board" control console separate from the control unit to generate one or more input operating command for wireless transmission from the "off-board" control console to the wireless receiver "on-board" the power machine or vehicle to operate one or more drive motors or drive components "on-board" the power machine or vehicle; and
    steering the power machine or vehicle using the one or more input devices on the "off-board " control console to control a driving direction of the power machine or vehicle through operation of the one or more drive motors or drive components.

7. An assembly comprising:
    an "on-board" control component including a wireless receiver configured to receive input operating commands and the "on-board" control component being coupled to a controller area network, connected to drive or hydraulic components of a power machine or vehicle; and
    an "off-board" control component separate from the "on-board" control component including a wireless transmitter configured to transmit the input operating commands to the "on-board" control component and the "off-board" control component comprising a body structure having a plurality of joystick devices configured to control the drive or hydraulic components "off-board" from the power machine or vehicle.

8. The assembly of claim 7 wherein the plurality of joystick devices are configured in an H pattern to provide forward, reverse and steer control input to one or more drive motors and lift/tilt control input to hydraulic actuators or cylinders on the power machine or vehicle.

9. The assembly of claim 7 wherein the plurality of joystick devices are configured in an ISO pattern configured to provide forward, reverse and steer control input to one or more drive motors and lift/tilt control input to hydraulic actuators or cylinders on the power machine or vehicle.

10. The assembly of claim 7 wherein the "off-board" control component comprises one or more levers to control auxiliary functions of a work implement or attachment connected to the power machine or vehicle.

11. The assembly of claim 7 and further comprising a cable including a connector configured to connect the "on-board" control component to the controller area network to control the drive or hydraulic components through the controller area network.

12. The assembly of claim 7 wherein the "on-board" control component includes one or more indicator lights connected to a body of the "on-board" control component to indicate when the receiver is enabled or operating.

13. The assembly of claim 7 wherein the "on-board" control component includes an "on-board" control unit containing the receiver and a separate controls box connected to the "on-board " control unit including a turn-key switch to enable an "off-board" control mode.

14. The assembly of claim 13 wherein the separate controls box includes an emergency stop button.

15. The assembly of claim 13 wherein the separate controls box is connected via a cable to the "off-board" control unit.

16. The kit assembly of claim 2 wherein the mounting assembly comprises:

a magnet connected to the body of the "on-board control" unit and configured to removably connect the "on-board" control unit to the power machine or vehicle.

17. The kit assembly of claim 1 wherein the first and second actuatable input devices comprise left and right joysticks configured to operate the hydraulic or drive components of the power machine in an H control pattern or an ISO control pattern.

18. The kit assembly of claim 1 wherein the hydraulic or drive components include lift and tilt actuator assemblies and left and right drive motor assemblies.

19. The method of claim 6 wherein the step of steering the power machine or vehicle comprises;
moving one or more joystick devices configured in one of an H or ISO control pattern to steer the power machine or vehicle.

20. The method of claim 6 wherein the step of providing the control unit having the wireless receiver "on-board" the power machine or vehicle comprises:
attaching the control unit having the wireless receiver to the power machine or vehicle; and
plugging the control unit into the controller area network prior to actuating the switch to enable the "off-board" control.

* * * * *